United States Patent [19]

Bement et al.

[11] 4,407,468

[45] Oct. 4, 1983

[54] EXPLOSIVELY ACTIVATED EGRESS AREA

[75] Inventors: Laurence J. Bement, Newport News; James W. Bailey, Tabb, both of Va.

[73] Assignee: The United States of America as represented by the Administrator of the National Aeronautics and Space Administration, Washington, D.C.

[21] Appl. No.: 259,209

[22] Filed: Apr. 30, 1981

[51] Int. Cl.³ .......................... F42B 1/00; B64C 1/32
[52] U.S. Cl. .................... 244/137 P; 89/1 B; 102/378
[58] Field of Search ............... 244/117 B, 119, 121, 244/122 AF, 137 P, 1 R; 49/141; 89/1 B; 102/378

[56] References Cited

U.S. PATENT DOCUMENTS 3,336,868  8/1967  Rush et al. .......................... 89/1 B
3,712,221  1/1973  Voigt et al. ......................... 89/1 B
3,919,939 11/1975  Murray et al. ....................... 89/1 B
4,333,381  6/1982  Boeglin et al. ................. 244/122 AF

FOREIGN PATENT DOCUMENTS 2062087  7/1972  Fed. Rep. of Germany ...... 102/378

Primary Examiner—Galen L. Barefoot
Attorney, Agent, or Firm—Howard J. Osborn; John R. Manning; Wallace J. Nelson

[57] ABSTRACT

A lightweight, add-on structure which employs linear shaped pyrotechnic charges 40 to smoothly cut an airframe 10 along an egress area periphery 30 and compromises reaction surfaces 62 attached to the exterior surface of the airframe's skin 20 and designed to restrict the skin deflection and jettison that portion of the airframe within the egress area periphery 30 and retention surfaces 72 and sealing walls 78 attached to the interior surface of the airframe's skin 20 and designed to shield the interior of the aircraft during detonation of the pyrotechnic charges 40.

17 Claims, 8 Drawing Figures

EXPLOSIVELY ACTIVATED EGRESS AREA

ORIGIN OF THE INVENTION

The invention described herein was made in the performance of work under a NASA contract and is subject to the provisions of section 305 of the National Aeronautics and Space Act of 1958, Public Law 85-568 (72 Stat. 435, USC 2457).

BACKGROUND OF THE INVENTION

This invention relates to rapid egress systems that are suitable for use in light general aviation and commercial aircraft that demand egress systems that are reliable, lightweight, and do not require redesign of existing airframes. Existing raipd egress systems have been developed with aircraft of different performance parameters in mind, and do not adequately meet the unique needs of the aircraft industry in three major aspects: design, weight and cutting/jettisoning effectiveness.

Existing rapid egress system are activated by either mechanical or pyrotechnic devices; both systems detach enframed egress panels from an airframe. Supporting frames for the egress panels are incorporated into the airframes to maintain structural integrity while the egress panels are detached. Incorporating the supporting frames into existing designs is costly, and requires substantial and costly stress analysis of the resulting structures because of changes in the distribution of forces within the entire airframe.

Weight is a major concern in designing light, general aviation aircraft due to relatively small power plants, and market demands for improved performance for both general and commercial aircraft. Mechanically activated systems are undesirable because they require linkage and piston-cylinder assemblies driven by auxiliary power sources which substantially increase the airframe's weight. Supporting frames designed to be a major load carrying element in an airframe are also undesirable for similiar reasons.

Since design and weight criteria restrict the use of supporting frames which protect egressing objects from roughly cut edges at the egress area periphery, it is important for the cutting means to produce a smoothly cut edge. Rough edges increase the potential of cutting an egressing object or preventing egress by snagging the object. Though flexible linear-shaped charges have been held against an airframe to cut the periphery of an egress area, there is not teaching of a structure which improves cutting effectiveness, smoothly cuts the airframe and acts to assist the jettisoning of the severed portion of the skin/airframe.

Accordingly, it is an object of this invention to provide a light-weight structure which smoothly cuts an airframe along the periphery of an egress area, and jettisons that portion of the airframe within the periphery away from the aircraft.

Another object of the invention is to provide an external containment cell bounded by the airframe's skin and reaction surfaces which extends along the egress area periphery for increasing the cutting effectiveness of a pyrotechnic device.

Another object of the invention is to jettison that portion of the airframe within the egress area periphery by transferring the explosive forces received by the reaction surface to that portion of the airframe within the egress area periphery.

A prime object of the invention is to provide a lightweight structure which can be added to an existing airframe that shields the airframe's interior from explosive forces and debris caused by detonation of the pyrotechnic device.

Another object of the invention is to provide a mechanism which will have no loss in effectiveness upon the airframe's load carrying characteristics.

A further object of the invention is to shield the airframe's interior while that portion of the airframe within the egress area periphery is jettisoned.

Yet another object of the invention is to provide a quick and easy means to activate the egress system with a bellcrank and lanyard detonator assembly.

Still another object of the invention is to provide a fine wire mesh screen over glass areas within the egress area periphery that will not interfere with vision, and carries any broken glass with that portion of the airframe which is jettisoned.

SUMMARY OF THE INVENTION

The foregoing and other objects of the invention are achieved by holding flexible linear-shaped charges against an airframe's skin, and adjacent to structural supporting members which parallel the egress area periphery. Thos charges held against the skin pass through structural supporting members which cross the periphery, while an additional charge is placed around the structural supporting member to ensure complete severance at the periphery. Reaction surfaces are attached to the exterior portion of the skin within the periphery, and extend across the periphery to limit the skin's deformation and roughness when the charges are initiated. The reaction surfaces also receive impulse forces from the charges that jettison the severed portion of the airframe while an external containment cell bounded by the reaction surfaces and skin provides adequate space for controlled deformation and cutting of the skin to occur. Retention surfaces attached to structural supporting members adjacent to, and outside the periphery, operate in conjunction with sealing walls to shield the airframe interior from explosive products on initiation of the charges while the severed portion of the airframe is jettisoned freely outward from the aircraft. The retention surfaces extend over the periphery and sealing walls before being bent toward the skin. The sealing walls extend perpendicularly from the skin within and adjacent to the periphery. An internal containment cell, bounded by the structural supporting members, retention surfaces, sealing walls and skin, contains a flexible closed-cell foam which prevents externally induced contamination and seals openings in the retention surfaces, as well as diffuses explosive forces and debris. When the charges are initiated by pulling (or pushing, according to handle layout) a handle attached to a bellcrank and lanyard-detonator assembly, that portion of the airframe within the periphery is smoothly cut from the airframe, and jettisoned from the aircraft. Plexiglass areas within the periphery are covered by fine wire mesh screens that carries the broken material with the jettisoned portion of the airframe. The resulting egress area provides smooth edges for safe egress, and is created by a lightweight. reasonable structure which does not interfere with the normal operation and design of the airframe.

Other advantages and objects, as well as a more complete understanding of the present invention will become apparent from the following explanation of an exemplary embodiment and accompanying drawings thereof.

DETAILED DESCRIPTION OF THE INVENTION

The invention is a lightweight device for providing a rapid egress area within an existing structure by smoothly cutting the structure along an egress area periphery, and jettisoning the severed portion. Though the preferred embodiment describes a device for rapid pilot egress from an aircraft, other applications for this invention will become apparent to those skilled in the art.

Figure 1:
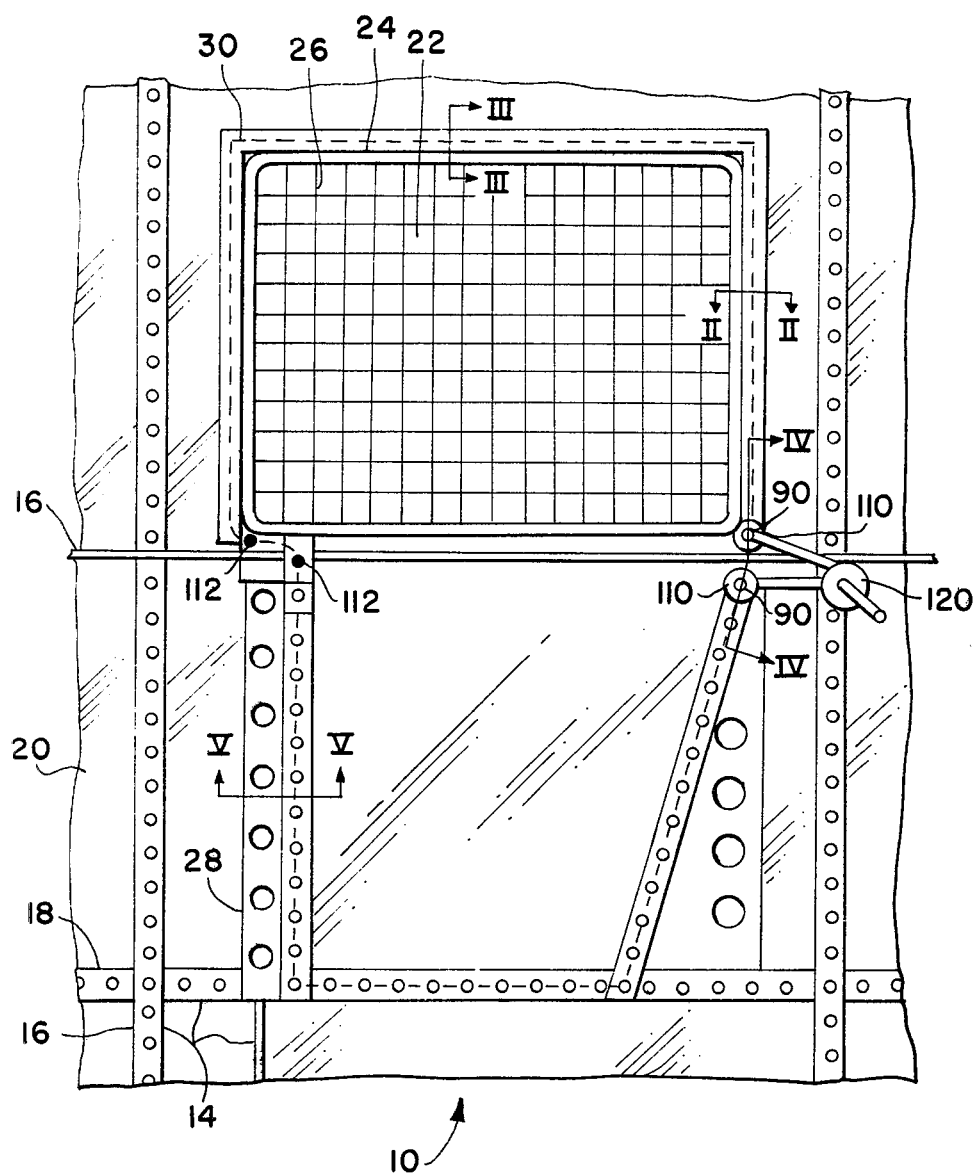
FIG. 1 is a plan view of the interior of a light general aviation airframe incuding the invention with portions cut away.

FIG. 1 is an interior plan view of a light, general aviation airframe 10, and includes a preferred embodiment of the invention. The airframe is fabricated from 1.02 mm (0.04 in) 2024-T4 flat stock aluminum, and is primarily composed of a skin 20 and structural supporting members 14: ribs 16, stringers 18 and frames 28 that provide additional strength to the ribs 16 and stringers 18 at high stress points. Sectional views of FIG. 1 (FIGS. 2, 3 and 5) reveal that the ribs 16 and stringers 18 have "U"-shaped cross-sections with the base of the "U" held perpendicular to the skin 20; other aspects of these drawings which relate to the invention will be discussed below. The base of the "U" provides the ribs 16 and stringers 18 with a depth, distance between the two outer surfaces of the "U"'s legs, of 38 mm (1.5 in). The airframe 10 also includes a 3.17 mm (0.125 in) thick plexiglass window 22 supported by a window frame 24, and having an approximate aperture of 381×762 mm (15 ×30 in).

A fine wire mesh screen 26 protects the aircraft interior from broken pieces of the window 22 by extending across the interior side of the window area and being attached to the window frame 24. The screen 26 carries broken pieces of the window with the severed portion of the airframe as they are jettisoned safely away from the aircraft when the invention is activated.

An egress area is defined on the airframe 10 by a periphery 30 shown in FIG. 1. Though a particular shape is not required, the preferred embodiment illustrates a design for rapid pilot egress and is located adjacent to existing ribs 16 and stringers 18 to minimize the weight of retention surfaces 22 which are discussed below. Other relevant factors that determine the size, shape and location of the egress area are distance, which the severed portion of the airframe must be jettisioned, and structural integrity of the aircraft once the airframe is cut along the periphery 30.

Figure 6:
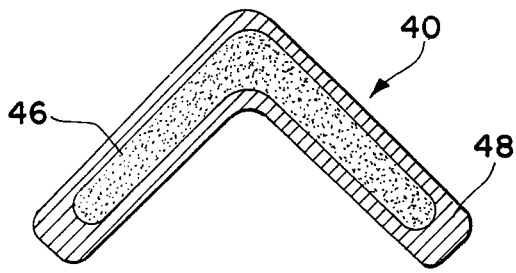
FIG. 6 is a cross-sectional view of a flexible linear-shaped charge.
Figure 8:
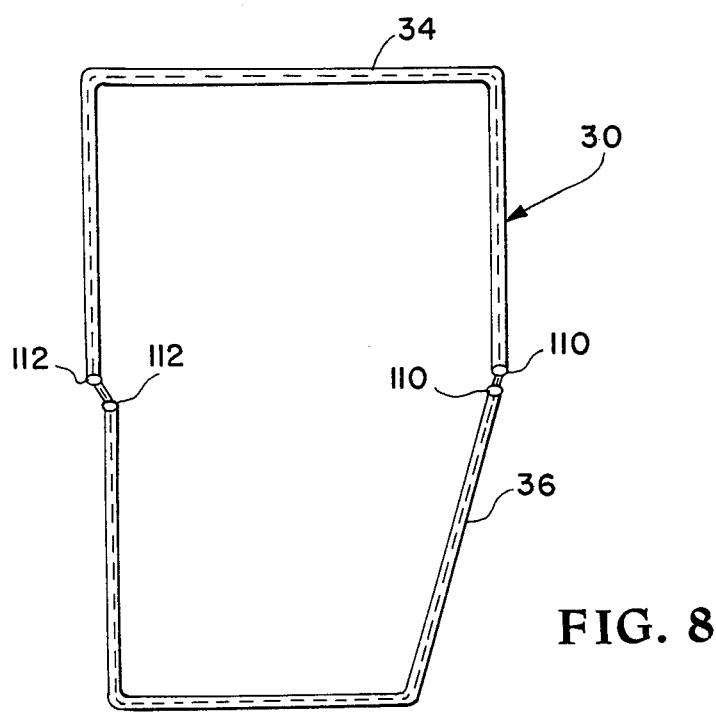
FIG. 8 is a plan view of the aircraft interior showing the locations of the explosive charges along the periphery.

FIG. 6 is a cross-sectional view of a (commercially available) flexible linear-shaped charge 40. The explosive material selected for this embodiment is hexanitrostilbene II (organic-precipitated HNS II) 46, enclosed in a silver sheath 48 at a concentration of 3.19 g/m (15 grains/ft.). This configuration generates approximately $2.0 \times 10^{10} N/m^2 (3 \times 10^6 psi)$ at a linear velocity of 7,250 m/sec (23,800 ft/sec) when initiated by an explosive pressure greater than $5.5 \times 10^9 N/m^2$ (800,000 psi), and resists initiation by normal gunfire, electromagnetic forces, fire or physical handling. The charges 40 are shaped in a chevron to focus and intensify forces generated by expanding gases and sheath materials during initiation. It would be apparent to those skilled in the art of pyrotechnics to vary the materials, size and shape of the charges 40 to meet different cutting requirements from those in the preferred embodiment. The charges 40 are held against the interior surfaces of the airframe 10 along the periphery 30 shown in FIGS. 1 and 8. Six lengths are used: one extending from an upper, forward manifold 110 along the upper portion of the periphery 34 to an upper, rear mainfold 112, one extending from a lower, forward manifold 110 along the lower portion of the periphery 36 to a lower, rear mainfold 112, and, two lengths extending between both forward mainfolds 110 and rear mainfolds 112. The forward manifolds 110 are located along the forward portion of the periphery 30 as oriented on the aircraft airframe 10, and the rear mainfolds 112 along the rear portion of the periphery 30.

Figure 4:
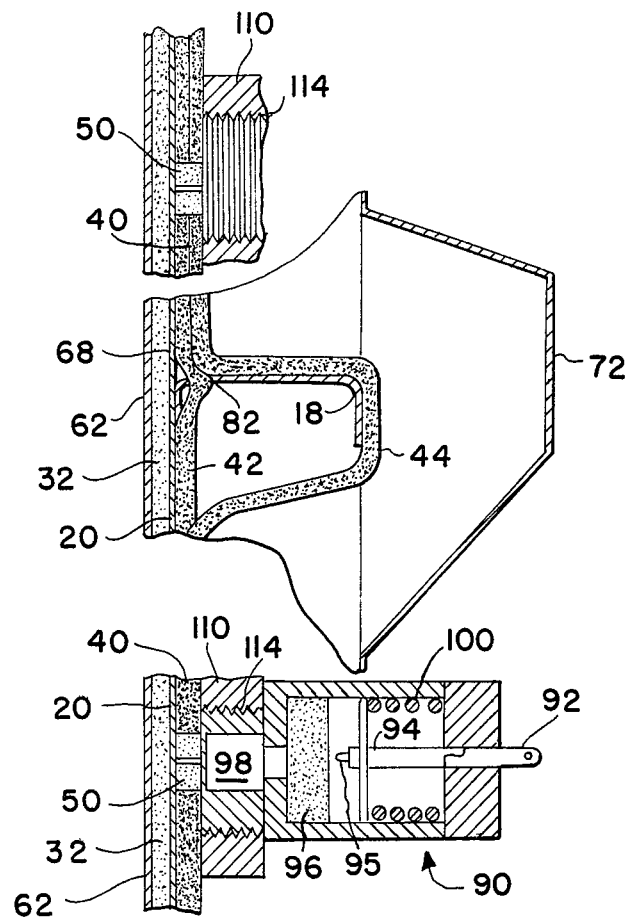
FIG. 4 is a sectional view of FIG. 1 along line IV—IV.

FIG. 4 reveals how charges 40 are arranged about a stringer 18 between the two manifolds 110 in ensure complete severance of both the stringers 18 and the skin 20. A first charge 42 lies against the skin 20 along the periphery 30 between the two manifolds, and passes through a hole 82 in the stringer 18. The hole 82 is located proximate to the skin 20, but does not significantly affect the stringer's load carrying capabilities because it is outside the bent radius of the stringer and; adjacent to the skin 20. A second charge 44 is held against, and wraps around the stringer 18, along the periphery 30. When initiated, the first charge 42 cuts the skin and that portion of the stringer adjacent to the skin while the second charge 44 cuts that portion of the stringer which is not adjacent to the skin. A similar arrangement for the charges 40 is used between the two rear manifolds 112 shown in FIGS. 1 and 8.

Figure 2:
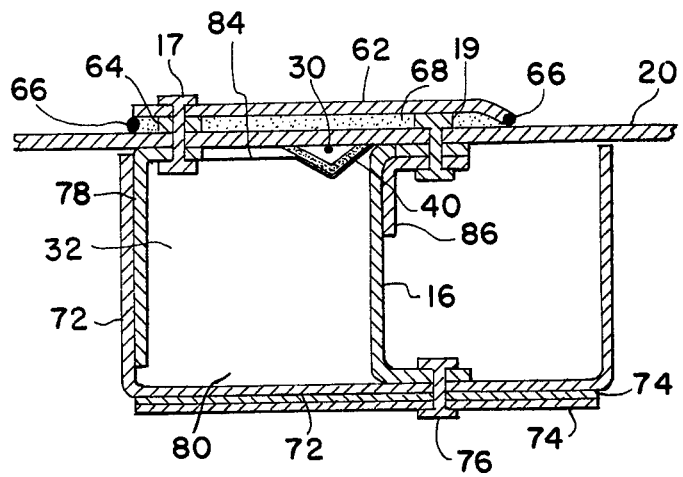
FIG. 2 is a sectional view of FIG. 1 along line II—II.
Figure 3:
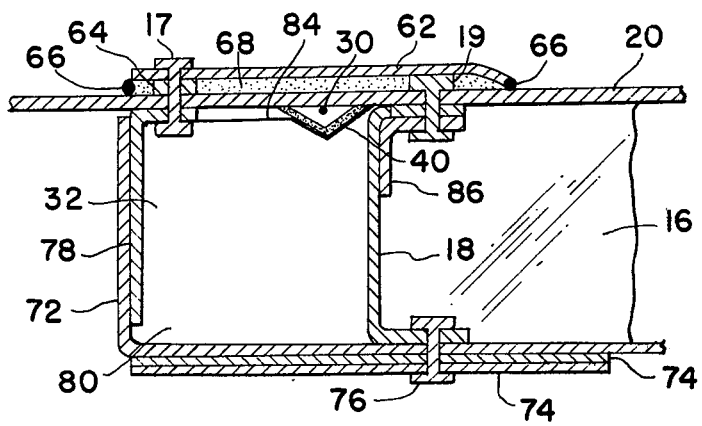
FIG. 3 is a sectional view of FIG. 1 along lines III—III.
Figure 5:
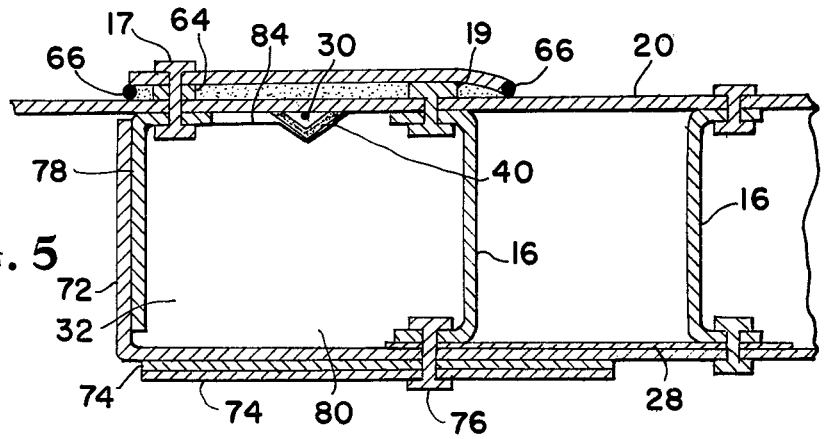
FIG. 5 is a sectional view of FIG. 1 along line V—V.

FIGS. 2, 3 and 5 are sectional views of FIG. 1 that more clearly show those aspects of the invention which improve the charge's ability to smoothly cut the skin and frame members along the periphery, and jettison the severed portion from the aircraft.

Bolts 17 secure spring-steel retaining clips 84, reaction surfaces 62, set-off plates 64, and sealing walls 78 to that portion of the skin within the egress area periphery. The retining clips 84 hold the charges 40 against the skin 20 with the obtuse angle of the charges facing those portions of the airframe that are to be cut.

Reaction surfaces 62 restrict the skin's deformation when the charges 40 are initiated, and transmit impulse forces received from the charges to the severed portion of the airframe. The reaction surfaces 62 on this aircraft are fabricated from 1.6×38.1 mm (0.063×1.5 in) colled-rolled steel strips which are longitudinally bent, (approximately 30°) toward the skin at a distance of 6.4 mm (0.25 in) from the unsecured edges which extend across the periphery 30.

An external containment cell 68, located between the reaction surfaces 62 and the skin 20, provides adequate space for controlled deformation and cutting of the skin when the charges are initiated. The external containment cell on this aircraft is 3.15 mm (0.125 in) thick, and is maintained by 2024-T4 aluminum set-off plates 64 held between the reaction surfaces 62 and the skin 20. Flexible closed-cell foam 32, 95% air by volume, is located within the external containment cell 68 for displacing contaminants and diffusing explosive forces from the charges 40. A silicon rubber sealing compound 66, located along edges of the reaction surface, further prevents contamination of the external containment cell 68 and further provides a temporary seal to the explosive pressure to assist in accelerating/jettisoning of the severed portion of the aircraft.

The reaction surfaces 62 and external containment cell 68 operate in conjunction with each other to control the skin's deformation, and smoothness of cut, when the charges 40 are initiated. It would be apparent to one skilled in the art to vary the geometry and materials of those aspects of the invention thus far described to meet the cutting requirements of different airframe type configurations, or to minimize aerodynamic drag induced by the reaction surfaces 62 in a flow field.

Sealing walls 78, secured by bolts 17 to that portion of the skin within the egress area periphery 30, are an element of the invention's structure which shield the airframe's interior from the charge's explosive forces. When the charges 40 cut the skin along the periphery, the sealing walls 78 also act as a supporting structure to the severed portion of the airframe. The sealing walls 78 and the retention surfaces 72 operate together in shielding the airframe interior from the charge's explosive forces, and will be discussed in detail below.

FIG. 2 shows bolts 19 in lieu of rivets that secure the skin 20 to various structural supporting members 14— ribs 16—which are adjacent to the egress area periphery 30. The bolts 19 also hold reenforcement angles 86 against the ribs 16 to prevent the ribs from being cut when the charges 40 are initiated. The reenforcement angles used in the preferred embodiment are fabricated from 1.6 mm (0.063 in) 6061-T6 aluminum.

"U"-shaped retention surfaces 72 are held at their base by bolts 76 to ribs 16 adjacent to the egress area periphery 30 with their legs directed toward the skin 20. The retention surfaces 72 are symmetric about the ribs 16 with one side of the retention surfaces receiving impulse forces from the charges, and the side transmitting these forces to the ribs 16 and skin 20; by transmitting some of the forces to the skin, the "U"-shaped retention surfaces reduce deformation of the ribs. Reenforcement plates 74 are held against the base of the retention surfaces to further prevent deformation by the charges 40. The sealing walls 78 extend perpendicularly from the skin 20, and are held firmly against the retention surface 72 to prevent explosive forces and debris from entering the airframe interior when the charges 40 are initiated. The sealing walls 78 and retention surfaces 72 are arranged to allow free outward movement of the severed portion of the airframe once the charges are initiated.

The reenforcement plates 74, retention surface 72 and sealing walls are fabricated from 1.6 m (0.063 in) thick 6061-T6 aluminum with the base of the retention surfaces, and the width of the reenforcement plates, measuring 76.0 mm (3.0 in).

Flexible closed cell foam 32, 95% air by volume is located within an internal containment cell 80 bounded by the ribs 16, retention surfaces, 72, sealing walls 78 and skin 20. The foam 32 serves to diffuse the charges' explosive forces, absorb debris, and seal any gaps or openings within the retention surfaces. When the charges 40 are intiated, the high pressure within the internal containment cell provides the force necessary to jettison the severed portion of the air frame outward. The size and shape of the internal containment cell 80 depends on the power of the charges 40 and the strength of the ribs 16, retention surfaces 72, sealing walls 78 and skin 20, it would be apparent to those skilled in the art to vary the dimensions and materials used in this invention to meet the needs of other applications.

FIG. 3 shows a similar configuration to that of FIG. 2, the difference is in the use of "L"-shaped retention surfaces due to the presence of the ribs 16. The retention surfaces 72 are secured by bolts 76 to a stringer 18, and extend over the ribs 16 which also support the stringer 18. Impulse forces received by the retention surfaces 72 are transmitted by the ribs 16 to the skin 20 in a similar manner as the structure in FIG. 2. The reenforcement plates 74 have been increased in width to 127.0 mm (5.0 in) to diffuse the impulse forces across a larger surface area on the ribs 16; other aspects of the invention are similar to FIG. 2.

FIG. 5 is a sectional view of FIG. 1 along a portion of the periphery which differs from portions shown in FIG. 2 in that "L"-shaped tretention surfaces 72 are supported by frames 28 located between the ribs 16. The frames 28 provide support to the ribs 16, and transmit impulse forces received by the retention surfaces 72 to the skin 20. The retention surfaces 72 are secured by bolts 76 to ribs adjacent to the periphery, and extend across the frames 28. In the preferred embodiment, that portion of the retention surfaces which parallel the skin, and the width of the reenforcement plates, are 76.0 mm (3.0 in) with approximately 25.4 mm (1.0 in) extending over the invention are similar to that in FIG. 2.

FIG. 4 illustrates how the reaction surfaces are modified in contour to accommodate the presence of a second charge 44 held about a stringer 18. The contour of the retention surfaces maintain a distance of 38 mm (1.5 in) from the charges 40. Since there is an increase in explosive forces along this region of the periphery, the retention surfaces are fabricated from 1.27 mm (0.05 in) stainless steel. Though the particular shape of the retention surfaces shown in FIG. 4 is not necessary, the contour should avoid sharp angles which create regions of high stress.

FIG. 4 discloses those structural elements which initiate the charges 40 within the forward manifolds 110. Commercially available booster tips 50 are potted on the ends of the charges 40 with a nonsolvent structural adhesive to seal to charges 40 from moisture, and to ensure initiation of the HNS II 46. The booster tips 50 are stamped from 0.15 mm (0.006 in) 302-A stainless steel into the form of cups, 4.82 mm (0.190 in) i.d., 8.89 mm (0.35 in) high, and are loaded with hexanitrostilbene I (HNS I) at $2.20 \times 10^8 N/m^2$ (32,000 psi) to a height of 3.81 mm (0.15 in). HNS I is more sensitive to initiation than HNS II and must be protected within the forward manifold 110 and rear mainfolds 112.

The forward mainfolds 110 shown in FIG. 4 are fabricated from 6061-T6 aluminum 12.7 mm (0.5 in) thick, and hold the charges 40 and booster tips 50 tightly within a groove 116 against the skin 20. Threaded ports 114 are located within the forward mainfolds 110 directly above the booster tips 50, and hold output cups 98 at a minimum distance of 0.50 mm (0.020 in) from the booster tips 50. The rear manifolds do not include threaded ports 114 or lanyard-detonator assemblies; otherwise they are similar to the forward manifolds 110.

The output cups 98, also containing HNS I, are part of a commercially available lanyard-detonator assemblies 90 that initiate the booster tips 50. Withdrawing sears 92 12.7 mm (0.5 in) releases firing pin assemblies 94 so that a compression spring 100 dirves a firing pin 95 into a percussion primer 96. The commpression springs 100 have a Hooke's constant of 700N/mm (40 lb/in), and exert an initial load of 35N (20 lb) against the firing pin assemblies 94 when the sears 92 are withdrawn. On release of the sears 92, the firing pin 95 is driven against the percussion primer 96, which creates a flame to initiate a lead azide column below the primer. The lead azide column causes the flame to progress to a high-order detonation, which in turn initiates the HNSI contained with the output cups 98 and booster tips 50.

Figure 7:
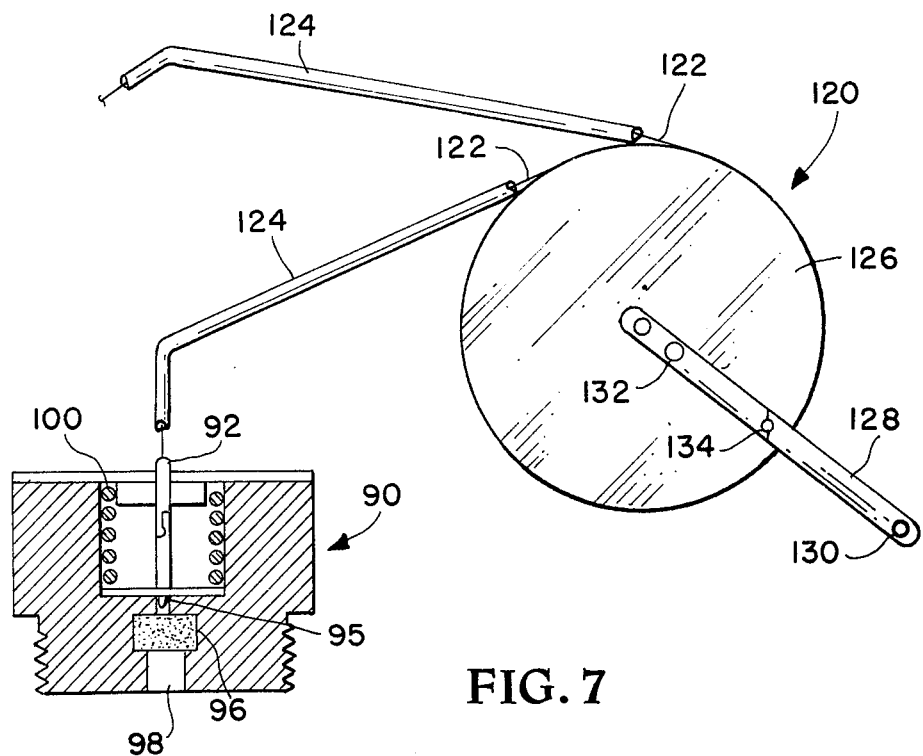
FIG. 7 is a detailed view of the bellcrank and lanyard-detonator assemblies.

The lanyard-detonator assemblies assemblies 90 are activated by rotating a bellcrank assembly 120 shown in FIG. 7. Wire cables 122 are attached to a pulley 126, and are threaded through guide tubes 124 which redirect rotational displacements of the pulley into linear displacements that withdraw the sears 92. The wire cables 122 are adjusted to activate the lanyard-detonators 90 at different times so that less energy is required to rotate the pulley 126. The pulley 126 has a 141.8 mm (5.50 in) diameter that results in a 49.6 mm (1.95 in) linear displacement when the pully is rotated 40° by a handle 130. The handle 130 which can be mounted 180° from that shown is supported by a 141.807 mm (5.583 in) lever 128 attached to the pulley 126, and restricted in motion by a ball release bayonet safety pin 134 and shear pin 132. The safety pin 134 extends through the lever 128 and pulley 126 before being secured to the airframe 10, and prevents pulley rotation until withdrawn. The pure aluminum shear pin 132, 3.175 mm (0.125 in) in diameter, also extends from the lever 128, through the pulley 126 before being connected to the airframe 10; applying an initial force of 137.9N (31 lb) to the handle 130 shears the shear pin 132 between the pulley 126 and airframe 10. Friction within the bellcrank and lanyard-detonator assemblies require a 93N (21 lb) force at the handle 130 to overcome 89N (20 lb) static loads applied from the lanyard-detonator assemblies 90, but dynamic friction during operation will be less.

OPERATION OF THE INVENTION

The invention is activated by withdrawing a safety pin 134 from the bellcrank assembly 120, and rotating the pulley 126 approximately 10.24° with a variable force averaging less than 137.9N (31 lb) to the bellcrank handle 130. This action withdraws sears 92 from lanyard-detonator assemblies 90 located at the forward manifolds 110 which initiate the output cups 98, booster tips 50, and charges 40; booster tips in the rear manifolds 112 are initiated by charges or other booster tips held proximate to each other in grooves 116 similar to those in the forward manifolds 110. The charges 40 sever the airframe 10 along a periphery 30, and provide impulse forces that jettison the severed portion of the airframe. Flame duration is reduced to less than five milliseconds by a sealing compound 66 which prevents excess air from reacting with debris from the charges 40 during initiation.

The portion of the airframe with the periphery weighs 6.62 Kg (14.6 lb), and is jettisoned at an initial velocity of 13.7 m/sec (45 ft/sec). Locating the center of gravity in the lower portion of the jettisoned airframe causes the lower edge to rotate outward relative to the upper edge, and increases the aerodynamic stability and the distance which the jettisoned area is thrown.

The external containment cell 68 provides necessary space for controlled deformation and cutting of the skin to occur, while the reaction surfaces 62 limit the total amount of deformation and roughness along the cut periphery. The reaction surfaces 62 also receive impulse forces from the charges 40 to jettison the severed portion of the airframe.

The retention surfaces 72 and sealing walls 78 offer no resistance to outward motion of the severed portion of the airframe while shielding the aircraft interior from the charges' explosive forces. Flexible closed-cell foam 32 contained within the internal containment cell 80 is forced by the explosive forces into any gaps or opening within the retention surfaces 72, diffuses shock waves, and aborbs debris caused by initiation of the charges 40. This structure minimizes the force of concussion waves set in motion by the charges to less than 34.5 kN/m$^2$ (5 psi) for durations of 1.0 milliseconds at a pilot's head level within the airframe; however, if the pilot is wearing a helmet, the pressure experienced by his ears will typically be less than 26.2 kN/m$^2$ (3.8 psi).

This invention is installed on existing light, general aviation airframes, and only weighs 11.17 Kg (24.6 lb). The result is a lightweight add-on structure which smoothly cuts the existing airframe along the periphery of an egress area, and jettisons the severed portion of the airframe for rapid and safe manula, unassisted agress of the pilot and passengers from within the aircraft.

What is claimed is:

1. A mechanism using pyrotechnics to cut an egress area within an existing structure which separates an interior and exterior region comprising:
    a structure means for separating exterior and interior regions;
    said structure means having a periphery to an egress area and includes a skin attached to frame structural support members;
    explosive charge means held against said structure means for cutting said structure means along said periphery;
    said explosive charge means being flexible linear-shaped charges;
    said flexible linear-shaped charges passing through and around said structural supporting members for cutting said skin and structural supporting members along said periphery;
    reaction surface means attached to the exterior surface of said structure means for receiving explosive forces from said explosive charge means, and limiting deformation of said structure means; and
    said explosive charge mena and said reaction surface means are arranged and constructed to cut smooth edges along said periphery, and jettison that portion of said structure means within said periphery when said explosive charge means are initiated.

2. A mechanism as in claim 1 wherein said reaction surface means and said structure means envelope containment cell means for improving the cutting effectiveness of said explosive charge means.

3. A mechansim as in claim 2 wherein said containment cell meanscontains a means for preventing contamination within said containment cell means, and for diffusing said explosive forces.

4. A mechanism as in claim 1 wherein a detonator means initiates said explosive charge means.

5. A mechanism as in claim 1 wherein:
a retention surface means and a sealing wall means are attached to the interior surface of said structure means for enveloping said explosive charge means, and shielding said interior region from said explosive forces; and
said retention surface means and said sealing wall means are arranged to shield said interior region from said explosive forces and allow said structure means within said periphery to be jettisoned freely when said explosive charge means are initiated.

6. A mechanism as in claim 5 wherein:
said structure means includes a skin attached to structural supporting member facing said exterior region;
said structural supporting members having members which are adjacent, approximately parallel to, and outside said periphery;
said sealing wall means is attached to said skin, is adjacent, approximately parallel to, and within said periphery; and
said retention surface means extend over said explosive charge means and said sealing wall means, and is attached to said structural supporting members which are adjacent, approximately parallel to, and outside said periphery.

7. A mechanism as in claim 6 wherein said reaction surface means and said skin envelope containment cell means for improving the cutting effectiveness of said explosive charge means.

8. A mechanism as in claim 7 wherein said containment cell means contains a flexible closed-cell foam for preventing contamination, and diffusing said explosive forces.

9. A mechanism as in claim 6 wherein said retention surface means are an "L"-shaped channel with one leg attached to said structural supporting members, and the other leg approximately parallel and adjacent to said sealing wall means.

10. A mechanism as in claim 6 wherein said retention surface means are a "U"-shaped channel with its base attached to said structural supporting members adjacent, approximately parallel to, and outside said periphery, with its legs directed toward the skin; and
said "U"-shaped retention surface means being symmetric about said attached structural supporting members for transmitting said explosive forces to said skin, and reducing deformation of said attached structural supporting members.

11. A mechanism as in claim 3 wherein said means for preventing contamination within said containment cell is a flexible closed-cell foam.

12. A mechanism as in claim 1 wherein a sealing means is bonded to edges of said retention surface means and said structure means for increasing said explosive forces upon said retention surface means.

13. A mechanism as in claim 2 wherein:
said structure means is an airframe; and
said egress area is for rapid pilot and passenger egress from within said airframe.

14. A mechanism as in claim 1 wherein:
said skin and said structural supporting members are part of an airframe;
said structural supporting members include ribs, stringers, and frames;
detonator means initiate said flexible linear-shaped charges; and,
said egress area is for rapid pilot and passenger egress from within said airframe.

15. A mechanism as in claim 1 wherein:
said structure means is an airframe including a skin supported by ribs, stringers, and frames;
a sealing wall means attached to said skin adjacent, approximately parallel to, and within said periphery;
a retention surface means attached to said ribs, stringers, and frames which are adjacent, approximately parallel to, and outside said periphery.
said retention surface means and said sealing wall means are arranged to shield said interior region from said explosive forces and allow that portion of said airframe within said periphery to be freely jettisoned when said explosive charge means are initiated; and,
said egress area is for rapid pilot and passenger egress from within said airframe.

16. A mechanism as in claim 11 wherein:
said structure means is an airframe having a skin supported by ribs, stringers, and frames; and,
said egress area is for rapid pilot and passenger egress from within said airframe.

17. A mechanism as in claim 13 wherein:
said airframe within said periphery includes a window supported by a window frame; and,
a screen means is attached to said window frame for preventing portions of said window from entering said airframe.

* * * * *